Jan. 26, 1965  G. PASCOE ETAL  3,166,844
APPARATUS FOR PLOTTING TWO DIMENSIONAL DATA
Filed March 3, 1961  2 Sheets-Sheet 1
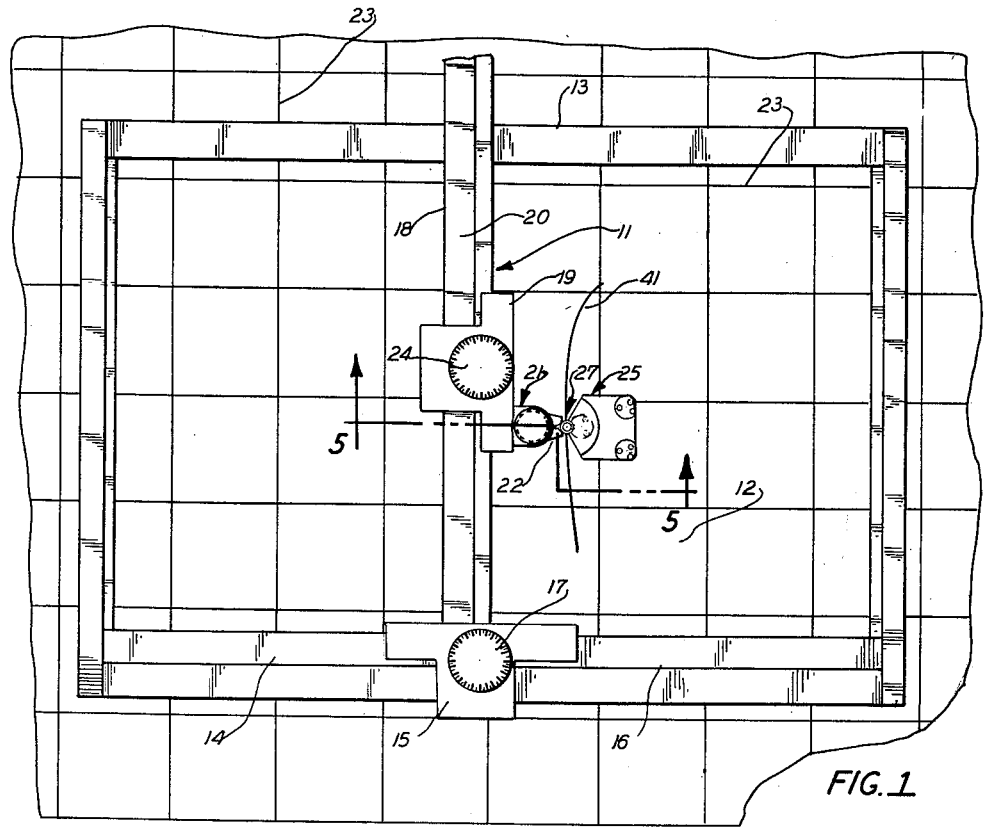
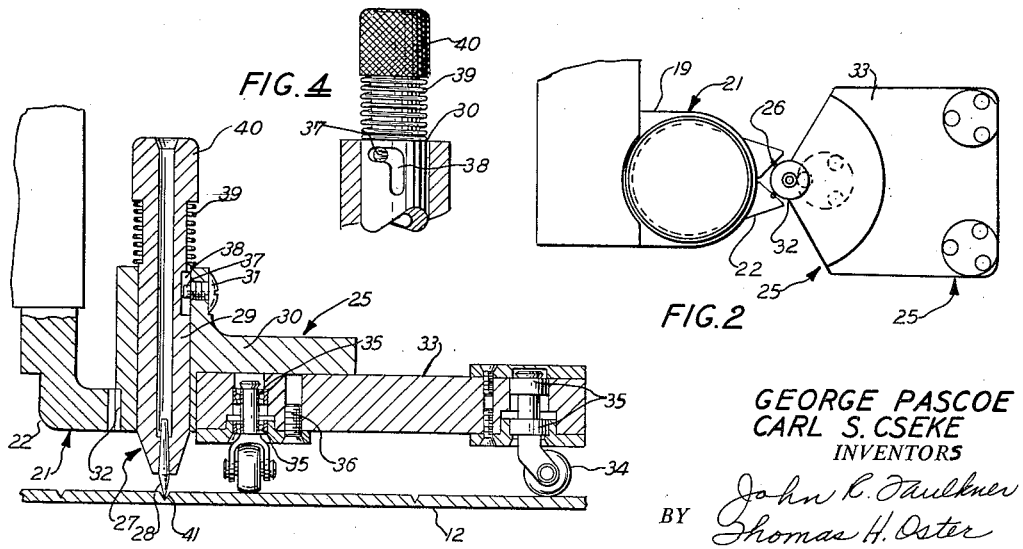
GEORGE PASCOE
CARL S. CSEKE
INVENTORS
BY John R. Faulkner
Thomas H. Oster
ATTORNEYS Jan. 26, 1965 G. PASCOE ETAL 3,166,844
APPARATUS FOR PLOTTING TWO DIMENSIONAL DATA
Filed March 3, 1961 2 Sheets-Sheet 2

GEORGE PASCOE
CARL S. CSEKE
INVENTORS

BY John L. Faulkner
Thomas H. Oster

ATTORNEYS

United States Patent Office 3,166,844
Patented Jan. 26, 1965

3,166,844
APPARATUS FOR PLOTTING TWO
DIMENSIONAL DATA
George Pascoe and Carl S. Cseke, Dearborn, Mich.,
assignors to Ford Motor Company, Dearborn, Mich.,
a corporation of Delaware
Filed Mar. 3, 1961, Ser. No. 93,146
9 Claims. (Cl. 33—1)

This invention relates generally to an apparatus used for plotting two dimensional coordinate values of points and more particularly to an apparatus for accurately locating a series of points on a contour line inscribed on the surface of a draft plate to assist in transcribing these points to templates for use in the preparation of tooling.

Conventional methods for plotting contour lines inscribed on the flat surface of a draft plate utilize a plotting apparatus, generally referred to as a coordinatograph, which is placed over the contour line to be read.

The coordinatograph comprises a frame and ordinate and abscissa straight edges having movable carriages mounted on guides thereon. The ordinate straight edge, which is normal to the abscissa straight edge, is connected at one end to the abscissa carriage. An optical probe attached to the ordinate carriage is positioned over any point lying on the contour line to be scanned. When the optical probe is focused over the point located on the contour line, the coordinate values of this point are read on the scales attached to the ordinate and abscissa straight edges. These values are then plotted on a corresponding object such as a template sheet.

The readings are repeated for a series of points lying on the contour line until the entire contour line is reproduced to scale on the template sheet.

In the design of sheet metal panels for automobiles, for example, various contour designs are transcribed on metal draft plates to assure stability of dimensional designs. These draft plates are usually made out of a stable light weight metal with their surfaces painted and having "X" and "Y" coordinate lines scribed into one of their surfaces. From the draft plate layouts, accurate templates are prepared to facilitate the fabrication of tooling required for the reproduction of sheet metal parts on a high volume basis. The current conventional coordinatograph method does not readily lend itself to recently developed electronic control systems and related instruments used in the preparation of templates for tooling.

To obtain a reading of a series of points expressed in "X" and "Y" coordinate values, the optical probe of current coordinatographs is focused on the contour line by the operator. To transcribe these readings, a switch may be activated manually so that suitable magnetic or photoelectric pickup devices mounted on the coordinatograph dials send an impulse to an electronic counter and readout unit. This unit forwards these readings electronically to a card or tape punch which records the series of located points.

In the manual operation of a conventional coordinatograph, visual effort is required by the operator in the positioning and focusing of the optical probe. The continuous operation of this tedious task by the operator has resulted in inaccuracies due to the improper positioning of the probe. Also, conventional methods are rather slow in transcribing complex multicurved contoured lines since a large number of points have to be located.

This invention provides for a detached mechanical probe assembly which greatly facilitates the operator's task of locating a series of points lying on contour lines and consistently will assure a greater degree of accuracy. The detached probe assembly of this invention is urged across the scribed contour lines on the draft plate and, either by gravity or by a light pressure exerted by the operator, the pointed tip of the mechanical probe of this invention accurately locates in the scribed contour line and remains confined in the depression of the scribed line until manually removed. The mechanical probe is adapted to make an electrical contact to energize an electrical circuit to give an instantaneous reading when the probe is accurately located on a point lying on the scribed contour line.

The object of this invention is to provide an improved apparatus which will determine with precision and minimum visual effort the "X" and "Y" values of a series of points on a contour line scribed into the surface of a draft plate.

A further object is to provide a probe which will activate an electrical circuit instantaneously to record the coordinate values of a point accurately located by the coordinatograph.

Further objects and advantages of the present invention will become more apparent in the following description, reference being had to the accompanying drawings, wherein:

FIGURE 1 is a plan view showing a coordinatograph of this invention on a draft plate;

FIGURE 2 is a partial plan view depicting an enlargement of the locating member of the coordinatograph and a detached probe positioned against the locating surface of the locating member which has electrical contact switches mounted upon its locating surface;

FIGURE 3 is a sectional view of the detached probe assembly positioned against the locating surfaces of the locating plate mounted upon the abscissa carriage;

FIGURE 4 is a partial sectional view of the adjusting means of the pointed pin of the detachable probe assembly;

Figure 5:
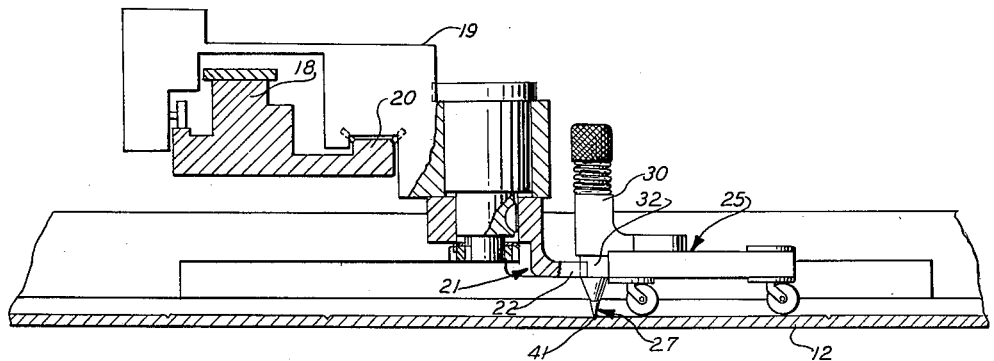
FIGURE 5 is a sectional view through the ordinate straight edge taken along line 5—5 of FIGURE 1 showing the construction of the abscissa carriage and the detachable probe assembly, in side elevation, positioned against the locating surfaces of the locating member.

In FIGURE 1 is seen a plan view of a two dimensional plotting instrument, generally called a coordinatograph 11, placed on the surface of a draft plate 12. The coordinatograph 11 has a rectangular frame 13 with one side of the frame 13 being an abscissa straight edge 14. An abscissa carriage 15 which is movable along a guide 16 has a rotating dial 17. This dial 17 is calibrated to give a reading of the "X" coordinate value of a located point in respect to a given "Y" axis. An ordinate straight edge 18, extending normal to the abscissa straight edge 14, has one end attached to the abscissa carriage 15. An ordinate carriage 19, movable along a guide 20, has an attached locating device 21 comprising a V-block plate 22 having a locating surface extending over the surface of the draft plate 12. The surface of the draft plate 12 has equally spaced "X" and "Y" grid lines 23 scribed on its entire surface.

A rotating dial 24, which is attached to the ordinate carriage 19, is calibrated to give a reading of the "Y" coordinate value of a located point in relation to a given "X" axis.

In FIGURE 2 is seen an enlarged partial plan view of a detachable probe assembly 25 which is used in conjunction with the V-block plate 22 attached to the ordinate carriage 19. Two contact switches 26 may be mounted on the locating surface of the V-block plate 22 as hereinafter discussed.

In FIGURE 3 is seen a sectional view of the detachable probe assembly 25 positioned against the locating surface of the V-block plate 22. The detachable probe assembly 25 is provided with a probe 27 comprising a pointed pin 28 held firmly in a cylindrical holder 29. The holder 29 is mounted in the bore of a housing 30 and retained in the housing 30 by a set screw 31. The housing 30, which has a semicylindrical locating surface 32, is attached to a base plate 33. The base plate 33 is mounted on three anti-friction casters 34 which are journaled in ball bearings 35. Screws 36 permit the adjustment of the casters 34 to to assure that the probe 27 is maintained perpendicular to the surface of the draft plate 12.

In FIGURE 4 is seen a partial plan view depicting the means for adjusting the probe 27. Set screw 31 has a tip 37 which is seated in an upside-down, L-shaped groove 38 cut into the periphery of the holder 29.

A spring 39 is disposed intermediate a head 40 and the top surface of the housing 30. As the head 40 is rotated, pointed pin 28 is retained in a scribed contour line 41 on the surface of the draft plate 12. When the tip 37 of the set screw 31 traverses the vertical portion of the groove 38, the pointed pin 28 attached to the holder 29 is raised from the depression of the scribed contour line 41 by the pressure exerted on its head 40 by the spring 39. The holder 29 will move in an upward direction until the tip 37 of the set screw 31 contacts the lower end of the vertical portion of the groove 38.

The detachable probe assembly 25 is readily urged manually across the surface of the draft plate 12 until the pointed pin 28 becomes confined in the scribed contour line 41. The entire area to be scanned is free from visual obstruction since the ordinate straight edge 18 is moved aside when the probe assembly 25 scans the surface of the draft plate 12. After the pointed pin 28 is confined in the depression of the contour line 41, the ordinate straight edge 18 is moved transversely across the draft plate 12 until it approaches the vicinity of the detachable probe assembly 25. Then the ordinate carriage 19 is manually positioned so that the locating surface of the V-block plate 22 locates firmly against the locating surface 32 of the housing 30.

In FIGURE 5 is a side view, partially in section, showing the detachable probe assembly 25 positioned against the locating surfaces of the V-block plate 22.

The reading of the dials 17 and 24 may then be taken to numerically record the coordinate values of the point located on the scribed contour line 41.

The detachable probe assembly 25 can also be readily urged along the contour line 41 without removing the pointed pin 28 from the scribed contour line 41. Thus, the speed at which the various points on the contour line 41 can be located is greatly increased.

Figure 6:
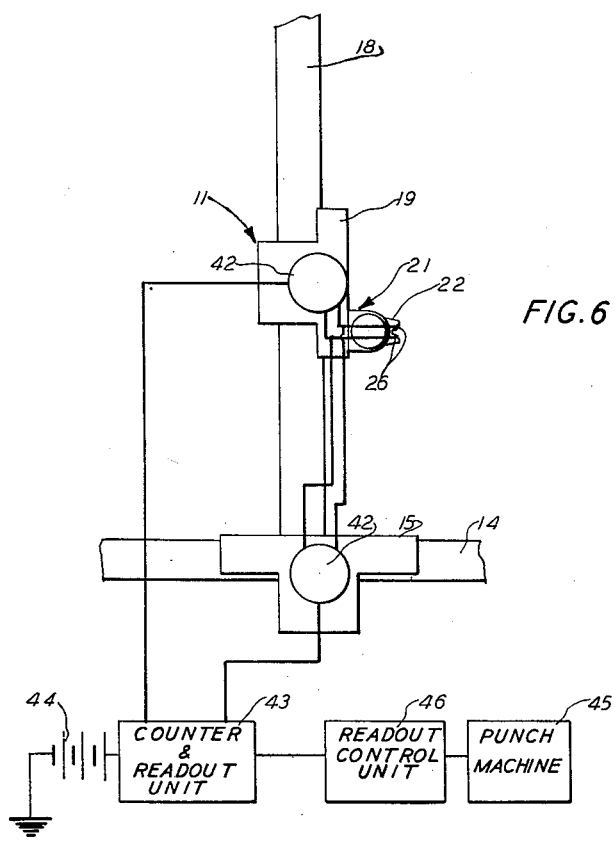
FIGURE 6 is a schematic diagram of an electrical circuit activated by contact switches mounted upon the locating member.

In FIGURE 6 is seen a schematic circuit diagram of an electronic numerical control system which, in this instance, is activated by two contact switches 26 mounted on the locating surface of the V-block plate 22 also seen in FIGURE 2.

When the locating surface 32 of the detachable probe assembly 25 is firmly located against the locating surface of the V-block plate 22, the two contact switches 26 will be depressed to energize an electrical circuit of the electronic numerical control system. Any other automatic or manually operated means to energize the electronic numerical control system may be used.

The electronic numerical control system may comprise suitable magnetic or photoelectric pickup devices 42 which can be readily mounted on the dial shaft of the plotting instrument 11. These pickup devices 42, which may be designed to generate one impulse for each .001 of an inch or some other suitable increment of movement of the measuring head, are wired to an electronic counter and readout unit 43 connected to power source 44. The counter and readout unit 43 automatically adds or subtracts the impulses received according to the direction of measurement. The accumulative "X" and "Y" numerical values are entered in this unit 43 when the electronic circuit is energized by the closing of the contact switches 26. The accumulative numerical values may be stored in the counter and readout unit 43 or may be recorded on punch cards or tape by a punch machine 45 if desired, in which instance the punch machine 45 is electrically connected to a readout control unit 46 and the counter and readout unit 43. Punch cards or tape are used to obtain appropriate equations of the given contour line 41 or activate template cutting machines according to the punch or tape data.

We claim:
1. A coordinate measuring device comprising a carriage adapted to move in two dimensions over a surface of a draft plate having a scribed line thereon, a first contoured locating device on said carriage, and an independent and freely movable probe assembly, said freely movable probe assembly being provided with a pointed probe and a second contoured locating device, said first contoured locating device and said second contoured locating device having mating surfaces, said pointed probe constructed and arranged to be confinable in said scribed line, said coordinate measuring device establishing the coordinate value of said pointed probe with respect to a known abscissa axis and a known ordinate axis when said probe is confined in said scribed line and said first locating device is mated with said second locating device.

2. A coordinate measuring device comprising a carriage adapted to move in two dimensions over a surface of a draft plate having a contour line scribed thereon, a first contoured locating device on said carriage, and an independent and freely movable probe assembly, said freely movable probe assembly comprising a base plate provided with a probe, said probe constructed and arranged to be confinable in said scribed line, said base having a locating surface, said locating surface and said first locating device having mating surfaces, said base plate having a conveying means, said conveying means adapted to convey said freely movable probe assembly in two dimensions over the surface of a draft plate when manually translated, said coordinate measuring device accurately establishing the coordinate value of said probe with respect to a known abscissa axis and a known ordinate axis when said probe is confined in said scribed line and said first locating device is mated with said locating surface.

3. The device as described in claim 2 and which is further characterized in that said conveying means comprises a plurality of casters attached to the underside of said base plate.

4. The device as described in claim 2 and which is further characterized in that said base plate has an adjusting means to keep said probe normal to the surface of said draft plate.

5. The device as described in claim 2 and which is further characterized in that said first locating device is a V-block plate having a locating surface and in that said locating surface of said base is of a semicylindrical configuration, said semicylindrical surface adapted to be positioned against the locating surface of said V-block plate.

6. A coordinate measuring device comprising a carriage adapted to move in two dimensions over a surface of a draft plate having a scribed contour line thereon, a first contoured locating surface on said carriage, and a freely movable and independent probe assembly, said freely movable and independent probe assembly comprising a base plate having a second contoured locating surface to be received by the first contoured locating surface of said carriage, said base plate being provided with a pointed probe, an adjusting means to raise or lower said probe pin with respect to the surface of said draft plate, said pointed probe when in a lowered position adapted to be confined in a depression formed by said scribed line on said draft plate, said coordinate measuring device accurately establishing the coordinate value of said pointed probe pin with respect to a known abscissa axis and a known ordinate axis when said pointed probe is confined in said depression and when said second contoured locating surface of said base plate is received by the first locating surface of said carriage.

7. A coordinate measuring system comprising a coordinate measuring apparatus, an electronic numerical device adapted to record coordinate values measured by said coordinate measuring apparatus, a first locating device, an independent and freely movable probe assembly having a locating surface, means for determining the position of said first locating device, said first locating device and said locating surface having mating surfaces, said freely movable probe assembly being provided with a probe, a means for actuating said electronic numerical device when said first locating device and said locating surface are mated, said first locating device and said locating surface when mated accurately establishing the location of the first locating device with respect to the probe.

8. A coordinate measuring system comprising a coordinate measuring apparatus, an electronic numerical device adapted to record coordinate values measured by said coordinate measuring apparatus, said coordinate measuring apparatus comprising a carriage adapted to move in two dimensions over a surface of a draft plate having a line scribed thereon, a first contoured locating device on said carriage, and an independent and freely movable probe assembly, said freely movable probe assembly being provided with a probe and a contoured locating surface, said first contoured locating device and said locating surface having mating surfaces, said probe constructed and arranged to be confinable in said scribed line, at least one contact switch on said first contour device, said contact switch being associated with said coordinating measuring apparatus and said electronic numerical control device, said coordinate measuring apparatus establishing the coordinate value of said pointed probe with respect to a known abscissa axis and a known ordinate axis, said contact switch being actuated when said first contoured device is mated with the locating surface of said probe assembly.

9. A coordinate measuring apparatus adapted to move over the surface of draft plate comprising support means having a first locating surface, an independent probe assembly freely movable on the surface of the draft plate, and means on said support means for determining the position of said first locating surface, said probe assembly having a second locating surface and a probe, said second locating surface positionable into a mating position with said first locating surface upon relative movement of said probe assembly with respect to said first locating surface on the surface of said draft plate, said first and second locating surfaces when in a mating position accurately establishing the location of said first locating surface with respect to said probe.

References Cited by the Examiner
UNITED STATES PATENTS

| 1,713,025 | 5/29 | Castleman | 33—76 |
| 2,618,860 | 11/52 | Engelhart | 33—1 X |
| 2,686,371 | 8/54 | Flis | 33—174 |
| 2,702,431 | 2/55 | Hillmer et al. | 33—125 |
| 2,873,535 | 2/59 | Gordon et al. | 33—189 |

FOREIGN PATENTS 771,607 4/57 Great Britain.

ISAAC LISANN, *Primary Examiner.*